Oct. 1, 1935.  E. SCHWARZKOPF  2,016,100
THERMO-MAGNETICALLY ACTUATED SOURCE OF POWER
Filed Jan. 6, 1932  2 Sheets-Sheet 1
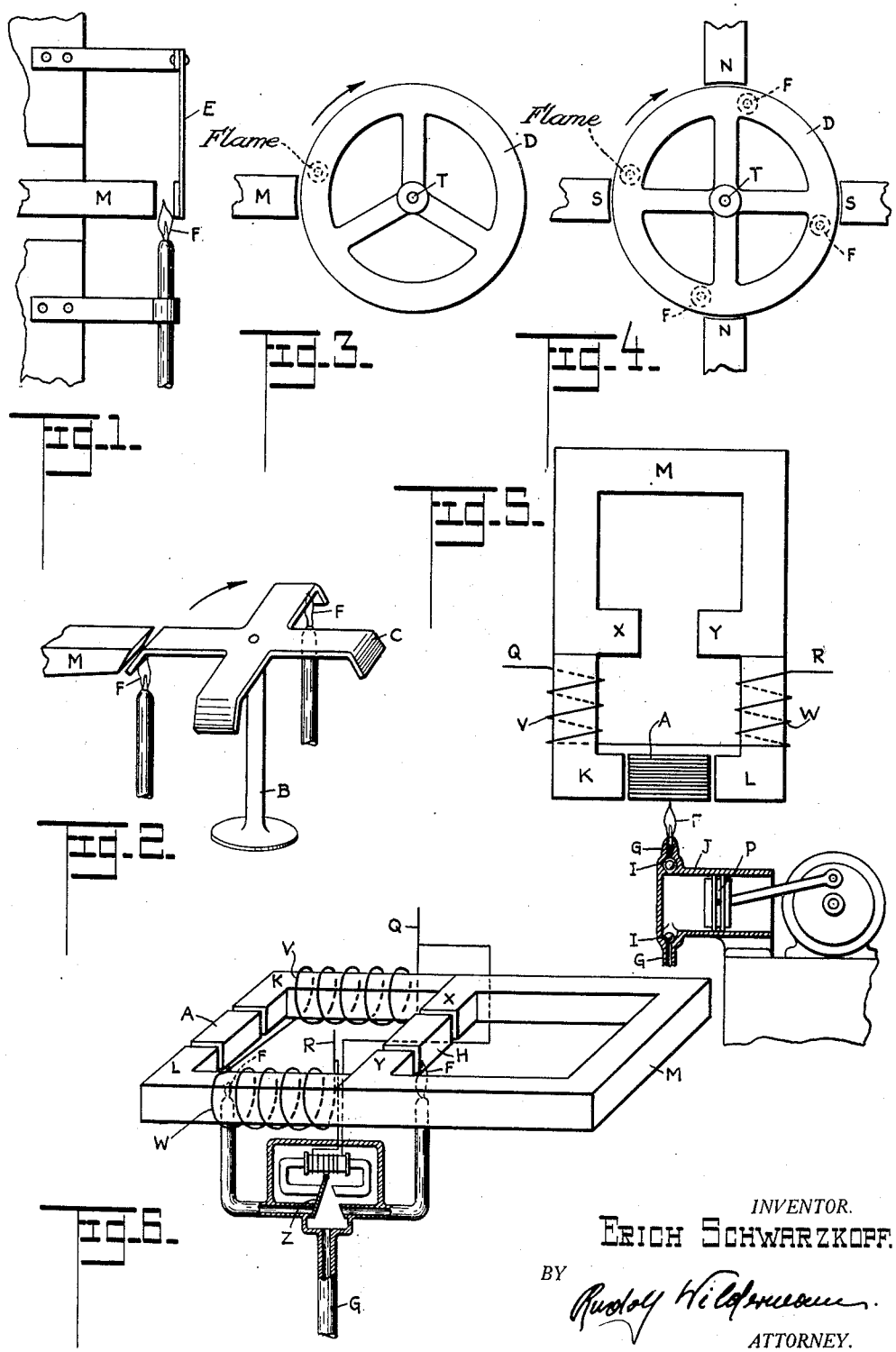
INVENTOR.
ERICH SCHWARZKOPF.
BY Rudolf Wildermann
ATTORNEY.

Oct. 1, 1935. E. SCHWARZKOPF 2,016,100
THERMO-MAGNETICALLY ACTUATED SOURCE OF POWER
Filed Jan. 6, 1932 2 Sheets-Sheet 2
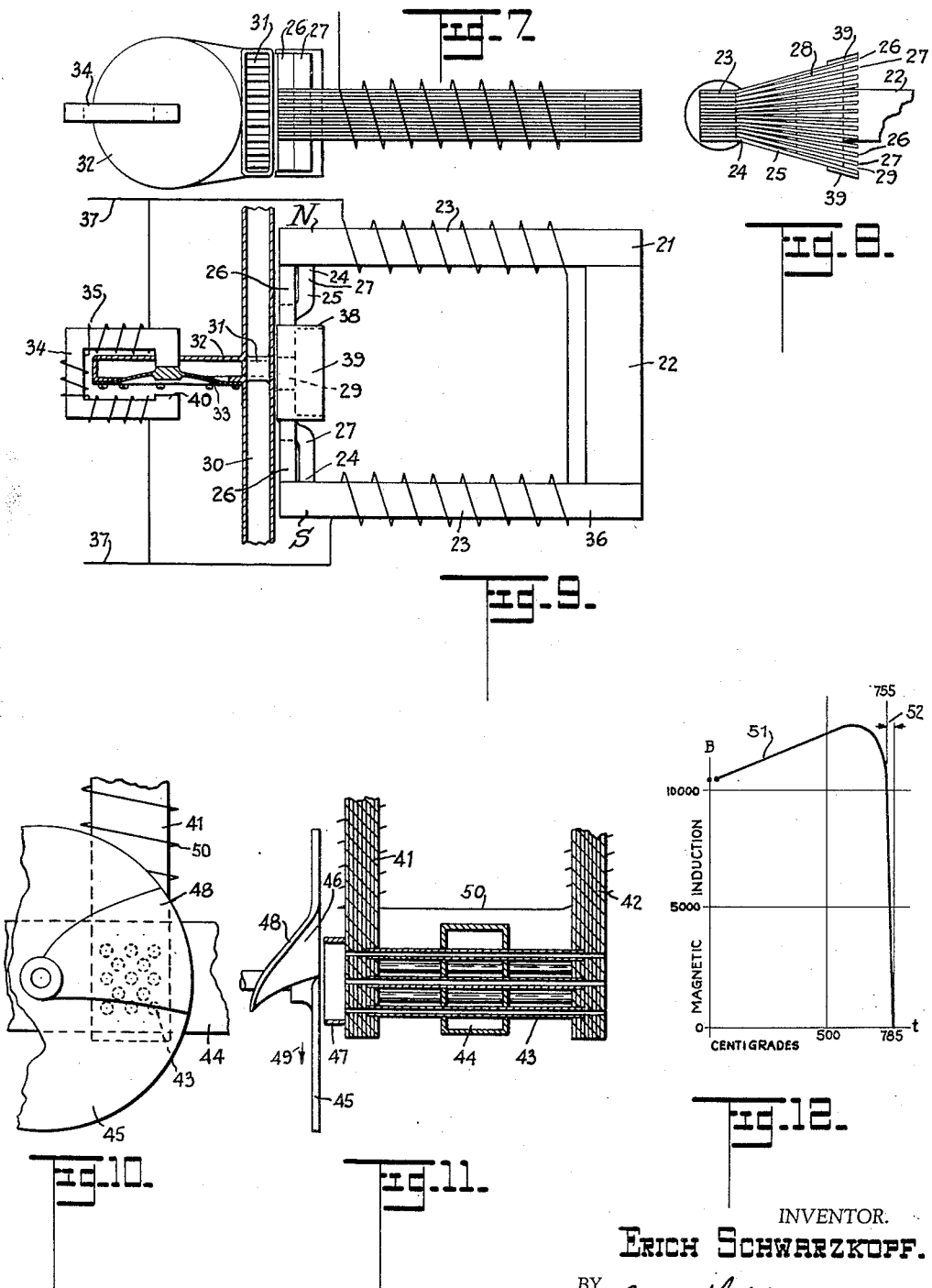
INVENTOR.
ERICH SCHWARZKOPF.
BY
ATTORNEY.

Patented Oct. 1, 1935

2,016,100

UNITED STATES PATENT OFFICE 2,016,100

THERMO-MAGNETICALLY ACTUATED SOURCE OF POWER

Erich Schwarzkopf, Jackson Heights, N. Y.

Application January 6, 1932, Serial No. 585,024

9 Claims. (Cl. 171—125)

This invention concerns a method of and means for converting energy of heat through the agency of magnetic means into other forms of energy, mechanical or electrical, i. e., it refers to thermo-magnetically actuated sources of power.

The method and means of this invention rely on principles which are distinct from those underlying the presently known heat actuated prime movers as well as thermo elements. It also distinguishes from sources of power operated upon such principles in respect to arrangement and construction, and by its simplicity, greater efficiency, and the absence of unnecessary moving parts and of intermediate storage of energy.

The principle underlying my invention is the change of the magnetic permeability of bodies, where their temperature is changed; this change of permeability partly or wholly creates or dissolves one or more magnetic fields, these field changes being used to set up energy, be it in mechanical or electrical form.

Methods producing electrical or mechanical energy by creating and dissolving magnetic fields are known; electrical motors, dynamo electric machinery and electric transformers are illustrations thereof.

It is also known that temperature changes affect the magnetic permeability of bodies, particularly of metals, alloys and their compositions. Phenomena of this kind have been thoroughly investigated, but not practically used. Different bodies show entirely different characteristics in respect to their magnetic permeability when their temperature is changed. The permeability of Swedish iron, for instance, has an appreciable rise between 600° and 800° centigrade, and drops to almost zero after the first critical point of temperature has been passed. Manganese steel is not magnetic at ordinary temperatures, and a strong cooling is necessary in order to permit magnetization. The Heusler manganese-copper-bronzes also show noticeable changes in their magnetic permeability when they are subjected to temperature changes.

All bodies, the permeability of which varies under temperature changes may be used for the method and means of my invention; in a practical instance, and in order to obtain a high efficiency, such bodies only are considered which show a sudden decrease and increase of permeability at one or more temperatures. The efficiency is so much the greater, the steeper permeability curve is disposed within the heating range, for then the least energy of heat is adduced to the body or is withdrawn therefrom in order to build up or destroy a magnetic field. Since the permeability changes which have been caused by the introduction of heat are reversed by cooling, it is clear that I prepare bodies in which this comes to pass completely, i. e., bodies which have little or no hysteresis of temperature. I also prefer bodies which show a sudden permeability variation at higher temperatures because a more rapid, natural cooling is possible in that instance, so that a greater amount of energy is released. I may use bodies which show leaps in the change of permeability at very low temperatures; but it is difficult to obtain a high degree of efficiency under those circumstances. I consider Swedish iron and the different types of transformer iron, which have been developed of late, useful for the purpose of the invention, since they show a sudden change of permeability at red heat, and since they have,—according to the latest investigations—a very low hysteresis of temperature. The following description has therefore reference to iron. It is however understood that other material of similar characteristics may be used.

I exemplarily illustrate my invention in the accompanying schematic drawings, in which Fig. 1 shows the elevation of a so-called thermo-magnetic buzzer.

Fig. 2 shows a perspective view of a thermo-magnetic motor.

Figs. 3 and 4 show plan views of modifications of thermo-magnetic motors.

Fig. 5 shows the elevation of a thermo-magnetic electric generator.

A modification of such a generator is shown in Fig. 6 in a perspective view.

Figs. 7 and 9 represent schematic side and top views of a practical application of my invention for the generation of currents, a manometric capsule being used to bring about the fluctuations of heat.

Fig. 8 shows in a corresponding end view the substantially bisected core of the modifications of Figs. 7 and 9.

Figs. 10 and 11 show, in a detail side view and in a partly sectioned top view, another modification of my thermo-magnetic generator.

Fig. 12 shows an exemplary temperature-permeability diagram for substantially pure iron.

Similar characters and numerals refer to similar parts throughout the various views.

The view of Fig. 1 gives an outline of the most simple apparatus for the conversion of heat into energy of motion by means of the creation and destruction of a magnetic field. The permanent magnet M inductively sets up a magnetic field in the flat spring E. When the spring E is heated at its lower end by the flame F, the magnetic permeability of the spring at the point where heat is applied thereto is decreased to a minimum, and the magnetic field is dissolved. This causes a release of the spring from the magnet and it moves away therefrom. When additional heat is applied, the same procedure repeats, until the second point of critical temperature of the material of the spring has been passed. If the supply of heat is interrupted by the removal of the flame F, the spring is attracted or released, according to the variations of permeability which take place in cooling. Alternate heating and cooling of the spring will therefore produce mechanical energy.

Fig. 1 specifically illustrates an apparatus functioning like an electric buzzer, which continuously operates on that principle. The spring E is mounted at such distance from the magnet M, that it is not exposed to the heat of the flame in the position shown,—which is the position it assumes when not attracted by the magnet. When the spring E is attracted by the magnet, it is within the range of flame F, subjected by the heat of the flame and demagnetized. The demagnetized spring is released by the magnet and moves from the sphere of heat into the position of the drawings. After cooling, the spring is again attracted and the cycle, during which the spring moves back and forth in the manner of an electric relay buzzer or bell, is repeated as long as heat energy is supplied. According to the arrangement of the earliest electro-magnetic machines, this movement may be used as a source of mechanical power.

In the arrangement of Fig. 2 an iron spider C is rotatably arranged juxtaposite a magnet M, the arms of the spider being in rotation engaged by the flux of the magnet, when the spider is rotated upon the stand B. Normally the spider will assume the position of Fig. 2, one of its arms facing the magnet M, due to the attraction thereof. In that position the arm facing the magnet, as well as an adjoining arm, are exposed to the heat of the two flames F; if they thus are heated to temperatures exceeding the critical point of permeability of the material, which the spider is made of, the spider rotates in the direction of the arrow, since the attraction of the arm of the spider, which adjoins the arm facing the magnet, and which has not been heated, exceeds the attraction exerted by the magnet upon the heated arm which is disposed opposite thereto. This figure shows the simplest form of executing a rotating device of my invention. A greater efficiency may be obtained by providing the spider with a greater number of arms and by providing a plurality of magnets and flames.

In the improved thermo-magnetic motor of Fig. 3, the magnet M faces a ring D, which is rotatably supported at its center T. The ring D is subjected to the heat of a flame F which is stationarily arranged at a point removed from a center line extending through the ring and the magnet. As the heat of flame F raises the temperature of the portion of the ring exposed thereto above the critical point, the magnetic field is dissolved in that portion of the ring; and the ring begins to rotate in the direction of the arrow, i. e., the direction in which the flame is applied thereto in respect to a center line extending through ring and magnet. The field in the ring is restored by cooling, when the heated portions move out of the range of the flame, during rotation of the ring. A continuous movement of the ring is brought about by the fact that the attraction of the magnet is greater in respect to the cooler parts (below the critical temperature) of the ring than in respect to the heated portions thereof (above the critical temperature). A plurality of magnets may be arranged around the periphery of the ring in the manner of the field magnets of electric motors.

Fig. 4 thus shows four magnet poles facing the ring D and four intermediary points at which flames F are applied to the ring. The magnets in this instance, are alternately marked S and N, in order to indicate their polarities. They represent, for instance, the suitably shaped terminals of a pair of horse shoe magnets.

In accordance with the precedents of electric machine design, it is understood that the permanent or horseshoe magnets shown in the various figures of the drawings, may be replaced by electro-magnets, which are either excited from an outside source of electric power, or by currents generated by the device itself (Fig. 5 and Fig. 6), or by a generator of electric currents actuated by the moving parts of the device. In the latter instance the thermomagnetic device would have to be provided with an electric starter.

Figs. 5 and 6 show exemplary modes of executing an apparatus for direct transformation of thermal into electrical energy. Contrary to the direct current produced by thermo elements, my thermo electric transformer produces a fluctuating or alternating current. A fluctuating potential is set up within the meaning of this invention by the creation or dissolution of one or more magnetic fields, more specifically by a variation of the permeability of a body caused by alternate heating and cooling of the body or parts thereof.

The permanent magnet M of Fig. 5 is provided with two poles X and Y from which extend the two cores K and L. The cores which are preferably made of iron, laminated iron, are provided with the coils V and W which are exemplarily connected in series. The core piece A closes the magnet circuit of the permanent magnet M. The magnetic flux, following the path of least resistance, extends through the cores K, L and A, only a fraction thereof being dissipated through the gap between the poles X and Y. When the pole piece A is heated above the temperature of its critical point of permeability, its magnetic resistance is increased, the magnetic field in cores K and L is weakened, since a greater part of the magnetic flux now passes directly across the gap between poles X and Y and momentarily an inductive potential is set up at the terminals Q and R of the coils V and W. A continuous, rhythmic heating and cooling of the core piece A will therefore induce a fluctuation or alternating current potential at the terminals of coils V and W. If the core piece A spans the gap between the poles X and Y, instead of extending between the ends of the cores K and L, rhythmic heating and cooling thereof will also set up fluctuating electric impulses in V and W.

In Fig. 6 I show such a second core piece H between the poles X and Y, in addition to the core piece A between the cores K and L. An arrangement of this kind will produce best results if during rhythmic temperature variations the core piece A is heated while the core piece H cools off, and vice versa. Such an arrangement sets up considerable fluctuations of the magnetic flux in the cores K and L, and it permits the induction of a strong alternating current in the coils V and W.

The continuous heating and cooling may exemplarily be caused by a fluctuating or flickering flame, as produced by the well known manometric capsules, or similar apparatus operating preferably on electro-magnetic principles. The core pieces may also be heated by a constant flame, and may be rhythmically cooled by a fluctuating gas current, which preferably is conducted through said pieces. It is also possible to combine rhythmic heating with rhythmic cooling, exemplarily by two manometric capsules, the membranes of which vibrate in synchronism, but in an opposite phase, one of said capsules controlling the flow of the heating gas whereas the other controls the flow of the gas which is used for cooling purposes. The cycle of the alternating current corresponds to the number of temperature variations changing the permeability of the cores.

An exemplary mode of providing the desired fluctuations in the flame is indicated in Fig. 5, in connection with the means which pump the heating gas through the conduit G to the point of use (flame F). I there provide a motor driven piston P, which is reciprocated in cylinder J. Near the head of the cylinder I provide check valves I, through one of which the gas is sucked into the cylinder through piston P, the upper valve I being closed during that stroke, whereas the pulsating gas supply for the flame F is provided by the compression stroke of piston P during which the lower valve I is closed and the upper valve is open.

In the arrangement of Fig. 6, a polarized relay actuates a damper Z, which alternately directs the supply of gas to the flames F heating the core pieces A and H, respectively.

Any known fuel, solid, liquid or gaseous, may be used for bringing about temperature changes in the device of my invention.

It is advisable to protect the heated parts by heat insulation, and to proceed with the cooling only within the ranges of temperature within which there is a steep incline of the permeability curve. The efficiency is increased, the quicker the building-up and the dissolution of the magnetic field follow each other. The efficiency is greater when the curves representing these steps are coextensive.

The surface of the rotating parts of a thermo-magnetic motor should be designed in such a manner, that, with a given flux and a number of poles, the parts, upon cooling, enter immediately the field of attraction of a magnet. If the heat of a thermo-electric transformer is controlled by manometric capsules or similar apparatus, such a device may readily be arranged by the skilled designer to adjust itself automatically to the favorable cycle as long as the current set up by the device is used for the actuation of those control means.

The part of the apparatus, the permeability of which is changed, may be made solid, laminated, or may even be spacedly arranged if the heating and the diffusion of the heat is thus expedited. Bodies used for this purpose may thus be made of sheet, wire, or pipe. The last mentioned material has the particular advantage of allowing the passage of gas currents therethrough for the purpose of rhythmic cooling, as would be required in the case of a thermo-electric transformer, to which constant heat is supplied.

An air gap is shown in Figs. 5 and 6 between the core pieces A and the adjoining core. This gap has been accentuated for the purpose of clarifying these illustrations. In a practical instance, if such gaps are used at all, they are made as small as possible, serving only to prevent the undesirable free conduction of heat from the heated core pieces into the adjoining core. Insulation may be applied in accordance with the knowledge of the prior art. Actual separation of the heated parts of the core from those parts which are not subjected to heat changes is omitted in the showing of Figs. 7 to 11.

The above referred to use of a manometric capsule is illustrated in Figs. 7, 8 and 9. In these figures I show a closed core 21. The rear 22 of said core is a permanent magnet; its two sides 23, and the ends 24 of the front section 25 of said core are substantially similar in cross-section. The front section 25 shows, however, each layer to be made up of two laminations 26 and 27. These laminations are arranged next to each other at the ends 24 of the front piece 25 of the core 21, where they merge into the sides 23 of said core. Near the center of the front piece 25 of the core 21, the laminations 24 are off-set so that they overlap the laminations 26 at the center, and are alternately disposed therebetween. In addition thereto, the said center parts of the laminations 26 and 27 are suitably spaced by insulating material 28, so that they represent a grating at the center of front piece 25, the alternate laminations 26 and 27 being interspersed by clearance spaces or gaps 29 at the center line. It is readily seen that, whereas the center of the front piece 25 of core 21 is differently shaped from the rest of said core, the aggregate cross-sections of the laminations at that point have not been reduced from the average cross-section of said core, but the thickness or width of the front section has been substantially narrower at its center, and is spread in such a manner that an instantaneous heating of the laminations 26 and 27 is possible by the conduction of hot gases through the gaps 29.

Through the heating chamber 30 pass the hot gases of a furnace (not shown). These gases play around the tubes 31, which extend across said chamber, and which open, upon one side, directly upon the transformer core, and more particularly upon the space 29 between adjoining laminations 26 and 27, and, upon the other side, upon the capsule 32. The capsule 32 is completely closed except where it opens upon the tubes 31. One wall of the capsule 32 is formed by a flexible, polarized membrane 33 which is adapted to be magnetically influenced and vibrated by a reversing flux in the electro-magnet 34. The coil 35 of electro-magnet 34 is connected in parallel with the coil 36 of core 21, in which the current is generated and passes to two feed lines 37.

A baffle casing 38 faces the inside of the front section 25 of the core 21. Said casing contains transverse compartments which are substantially in alignment with the gaps 29 in the front section 25 of the core 21. The heat-insulated shell 39 of casing 38 extends over the top and bottom of the front section 25 of core 21 up to the chamber 30.

The device of Figs. 7, 8 and 9 functions as follows:—

The gases in the heating chamber 30 heat the atmosphere contained in the tubes 31, which expands, is driven into the gaps 29 of the core 21 and heats the laminations 26 and 27 until the flux set up therein by the permanent magnet 22 is interrupted, because at a critical temperature the permeability of laminations 26 and 27 has dropped. The current set up in coil 23 by the change in flux energizes the electro-magnet 34 by means of coil 35, so that the polarized membrane 33 is attracted by pole 40 of magnet 34, sucking in cool air from the baffle casing 38 into the gaps between laminations 26 and 27. These cool gases reduce the temperature at the center of the front piece 25 of the core 21 to such an extent, that the permeability at said point is restored. The flux of magnet 34 therefore passes again through the core and sets up new currents in the coil 23, which are directly opposite to the currents which previously were set up when the permeability of the core dropped, said new currents also influencing the electro-magnet 34 in such manner that the polarized membrane 33 is now drawn into the capsule, pushing out of the capsule the air contained therein and pushing the atmosphere which has in the meantime been heated in the tubes 21 into the gaps 29 of core 21. This hot atmosphere again raises the temperature at the center of front piece 25 above the critical temperature, a current, which is similar to the one which was set up in the first instance in coil 23, again reverses the flux set up in electro-magnet 34, so that the membrane 33 is again attracted by pole 40, the capsule sucking cold atmosphere from the baffle casing 38 into the gap 39. The temperature of laminations 26 and 27 drops below the critical temperature of permeability so that the flux therein is restored; thus the cycle of electric, magnetic and thermal operations is repeated, as long as heat is supplied. The baffle casing 38 is shaped in such manner that the atmosphere breathed out by the capsule 33 thereinto is there cooled below the critical temperature of permeability of the center of the front piece of the core. It may be constructed more or less long so as to allow less or more diffusion of the outside atmosphere into the said atmosphere, controlling the cooling thereof.

In the arrangement of Figs. 10 and 11, the poles 41 and 42 of a magnet, which represent the cores of an electric coil in which the currents are to be set up, are connected by a plurality of pipes 43. These pipes are made of a material which shows the desired permeability variations at certain temperature changes. The pipes 43 extend in the manner of fire tubes through the heating chamber 44 of a furnace (not shown), the hot gases in said chamber heating said pipes above their critical permeability temperature. The pipes issue through the pole 41 into a manifold 47, which, in turn, eccentrically faces a rotatable disc 45. The disc 45 is provided with one or more openings 46 which, once upon each rotation of disc 45, register with the manifold 47. The disc is rotated in the direction of arrow 49, said disc normally closing the end of manifold 47. But when the opening 46 registers with the manifold 47, the vane 48 pushes a certain amount of air through said opening into the manifold, from where it is, in turn, propagated as an air wave through the pipes 43. The amount of air thus pushed through the pipes upon each rotation of the disc, when the opening 46 registers with manifold 47, is sufficient temporarily to lower the temperature of the pipes, where said pipes pass through the heating chamber 44, below the critical permeability temperature of said pipes. During the intervals of rotation of the disc 45, in which the manifold faces the disc, the air in the pipes is stationary and allows said pipes to be momentarily heated above the said temperature.

The flux set up in the poles 41 and 42 by the magnetizing means (not shown) connected therebetween in the manner of the permanent magnet 22 of Figs. 7, 8 and 9, is therefore interrupted in cycle with the rotations per second of disc 45, if the disc has one opening 46. A single phase, 60 cycle alternating current is therefore set up in a coil 50 disposed upon the poles 41 and 42, when the disc 45 is rotated at 3600 R. P. M., said disc setting up cooling air pulsations, which may be compared with the air blows set up by sirens or sound producing tops, it being understood that any devices of said kind may be substituted for the disc.

In order to make unequivocal the disclosure of this description of my invention, in particular in respect to what is referred to as a critical permeability temperature, I point out in connection with the diagram of Fig. 12 the preferred heat changes made use of the operation of my device. The induction curve 51 shown was produced with a field of 4 gauss, the induction B being plotted against the temperature in centigrade. While the decline of the induction curve begins at about 600°, I have demarked the range 52 between 655 and 685, as the range of a sudden permeability drop. In order to obtain a cycle of increases and decreases of $B=10,000$, the cyclic temperature fluctuations would be arranged to extend over the difference of 30° between said temperatures. Critical permeability temperatures refer therefor to such a range of sudden permeability changes.

My means and method concern, therefore broadly, a change of the permeability of a magnet core, for instance by changing the temperature thereof, and the utilization of the fluctuation caused thereby in the flux in said core, for the generation of current or mechanical movements.

What I claim is:—

1. A thermo-magnetic source of electric power comprising a permeable element closing a magnetic field, electrically controlled means changing the permeability of said means and thereby varying said field, and an electric conductor inductively disposed in said field and electrically coupled with said means.

2. A source of electric current, comprising a permeable core, a coil surrounding said core, means magnetizing said core, means heating a cross-section of said core, and means rhythmically interrupting the heating of said core by said heating means and controlled by the current set up in said coil.

3. A source of electric current, comprising a magnetized permeable core, a coil surrounding said core, said current being set up in said coil, means raising the temperature of said core, means lowering the temperature of said core, and means controlling said means and actuated in response to the temperature fluctuation in said core.

4. A source of electric current, comprising a magnetized permeable core, a coil surrounding said core, said current being set up in said coil, means raising the temperature of said core, means lowering the temperature of said core, and means controlling said means and actuated by the current set up in said coil by the temperature fluctuation in said core.

5. A source of electric current, comprising a magnetized permeable core, a coil surrounding said core, said current being set up in said coil, and a device controlled by the fluctuations of said current and alternately raising and lowering the temperature of said core.

6. A source of electric current, comprising a magnetized permeable core, a coil surrounding said core, said current being set up in said coil, a source of a hot fluid, and a propeller pulsatingly passing said fluid through said core.

7. A source of electric current, comprising a magnetized permeable core, a coil surrounding said core, said current being set up in said coil, and means reciprocating a fluid through said core and thereby rythmically alternating the temperature of said core.

8. A source of electric current, comprising a magnetized permeable core, a coil surrounding said core, said current being set up in said coil, and means actuated by the pulsations of said current, reciprocating a fluid through said core and thereby rythmically alternating the temperature of said core.

9. A source of electric current, comprising a magnetized permeable core, a coil surrounding said core, said current being set up in said coil, means raising the temperature of said core, means lowering the temperature of said core, and means controlling said temperature lowering means and actuated in response to the temperature fluctuation in said core.

ERICH SCHWARZKOPF.